US012011819B2

(12) United States Patent
Lv

(10) Patent No.: US 12,011,819 B2
(45) Date of Patent: Jun. 18, 2024

(54) HEAD REPLACEABLE ELECTRIC TOOL WITH SAFETY MECHANISM

(71) Applicant: Jinhua Dalv Technology Co., Ltd., Zhejiang (CN)

(72) Inventor: Zhenqiang Lv, Zhejiang (CN)

(73) Assignee: Jinhua Dalv Technology Co., Ltd. (CN)

( * ) Notice: Subject to any disclaimer, the term of this patent is extended or adjusted under 35 U.S.C. 154(b) by 0 days.

(21) Appl. No.: 17/550,116

(22) Filed: Dec. 14, 2021

(65) Prior Publication Data

US 2022/0193882 A1 Jun. 23, 2022

(51) Int. Cl.
*B25F 5/02* (2006.01)
*B25F 3/00* (2006.01)

(52) U.S. Cl.
CPC . *B25F 5/02* (2013.01); *B25F 3/00* (2013.01)

(58) Field of Classification Search
CPC .................................... B25F 3/00; B25F 5/02
See application file for complete search history.

(56) References Cited

U.S. PATENT DOCUMENTS

| | | | | |
|---|---|---|---|---|
| 6,153,838 | A * | 11/2000 | Wadge | H01H 3/20 200/50.01 |
| 9,956,677 | B2 | 5/2018 | Baskar et al. | |
| 2021/0370489 | A1 * | 12/2021 | Dance | B25F 5/001 |
| 2022/0193875 | A1 * | 6/2022 | Lautenschläger | B25B 23/0028 |

FOREIGN PATENT DOCUMENTS

| | | |
|---|---|---|
| CN | 103722537 | 12/2015 |

* cited by examiner

*Primary Examiner* — Daniel Jeremy Leeds

(57) ABSTRACT

The present disclosure provides a head replaceable electric tool with a safety mechanism, which has a tool body and at least one working head, the working head is detachable; the tool body has a machine body housing, a motor mounted in the machine body housing, and a working head engagement device arranged at an output end of the tool body; a switch body is arranged on the tool body; a button is arranged on the switch body; a locking device is arranged in the tool body; a main body of the locking device is arranged in the machine body housing and is arranged concentrically with the working head engagement device; the locking device is connected to an inner wall of the machine body housing through screw threads or a slope; and a safety mechanism for locking the button is arranged between the tool body and the working head.

8 Claims, 16 Drawing Sheets

HEAD REPLACEABLE ELECTRIC TOOL WITH SAFETY MECHANISM

TECHNICAL FIELD

The present disclosure relates to the technical field of electric tools, and particularly, relates to a head replaceable electric tool with a safety mechanism.

BACKGROUND

It is well known that a multi-head power tool can include a plurality of replaceable working heads. Such power tool is disclosed in U.S. Pat. No. 9,956,677B2. This working head power tool can quickly detach a number of different working heads to meet the requirements of different operation occasions. However, the connection between a working head part and a tool body disclosed in the above-mentioned document has drawbacks. For example, a reciprocating saw working head, as shown in FIG. 10, FIG. 14, and FIG. 22 of the description disclosed in U.S. Pat. No. 9,956,677B2, the connecting ends between this type of working heads and tool bodies must be kept in tight fit during an operation. Once there is a fatigue wear clearance at a connecting part of the working head and the tool body, the work efficiency of this type of working heads is significantly reduced. When the working head and a tool body connecting end of the disclosed multi-head power tool are connected, two states of opening and closing of an open steel ring are realized through its own elastic deformation relying on the open steel ring arranged in the tool body. The working head is quickly inserted into the tool body to guide the open steel ring to open forcibly. After connection, the open steel ring returns to a closed state relying on its own elasticity, and engages a clamping groove formed in the connecting part of the working head when closed. Since the steel ring is in line contact with the clamping groove, a connecting matching surface between the working head and the open steel ring is small, the locking force is small, and there is a hidden danger of loosening the connection between the working head and the tool body. In addition, during use, a clearance between the working head and the tool body connecting end will become larger, which may seriously cause damage and deformation of a connecting surface of the connecting end. The connecting matching surface of the working head and the tool body is smaller, and the clearance between the connecting surfaces of the working head and the tool body connecting head becomes larger when the working strength increases, thereby affecting the connection and matching of other working heads and the tool body. In addition, this clearance cannot be compensated, the practical efficiency of the tool is greatly reduced, and the service life of the tool is greatly shortened.

Another known multi-head power tool of a power tool system is disclosed in CN103722537 B. I also has a plurality of quick release working heads. The disclosed multi-head power tool uses a rotatable limiting ring arranged in a tool body. A wedge-shaped block is arranged on an inner ring surface of a limiting ring. The limiting ring has an unlocking position and a connecting position. When connected, a pushing block on the working head is inserted into the tool body to push the wedge-shaped block on an inner surface of the limiting ring to rotate to the unlocking position. After the working head is connected in position, the limiting ring automatically returns to the connecting position by relying on a returning spring. At this time, the wedge-shaped block is axially engaged with the pushing block. Although the pushing block on the working head is provided with an inclined matching surface to realize locking and matching of the working head and the limiting ring, the pushing block is also in line contact with the wedge-shaped block. During high-intensity working, the matching surfaces of the pushing block and the wedge-shaped block are prone to fatigue wear and produce a fit clearance. Since the limiting ring needs to be arranged in the tool body in a flexibly rotating manner, a running clearance must be artificially arranged therebetween. Although the area of a connecting end matching surface between the tool body and a working head connecting end is increased, there is still a connecting clearance after the working head is connected to the tool body during normal use since the existence of the running clearance between the limiting ring and the tool body. The clearance will be enlarged when a reciprocating saw working head is used, which will reduce the efficiency and shorten the service life after long-time operation.

The connecting structures of the working heads and the tool bodies of the multi-head power tools disclosed above are not perfect and reliable. It seems that the multi-head power tool disclosed in CN103722537 B solves the matching clearance between the working head and the limiting ring, but the matching structure has poor fatigue resistance and wear resistance, and meanwhile, there is still a fit clearance between the limiting ring and the tool body. Since there are a plurality of working heads, the fit clearance of each working head and the tool body is inconsistent, and more importantly, the fit clearance between the working head and the tool body cannot be compensated and adjusted, so the prior art can be improved.

SUMMARY

The present disclosure provides a head replaceable electric tool with a safety mechanism aiming at the deficiency that a machine body and a working head are easily damaged due to the facts that a clearance between the existing machine body and the working head is large and cannot be compensated. According to the head replaceable electric tool with the safety mechanism, a connecting position is not easy to loosen during working, the strength of a connecting matching surface is high, the connection stability is reliable, the fatigue resistance and wear resistance of the connecting matching structure is strong, a connecting matching clearance compensating function of different working heads is realized, the service life of a commenting structure is long, and the connecting position is prevented from triggering an unlocking position accidentally.

An objective of the present disclosure is achieved through the following technical solution: a head replaceable electric tool with a safety mechanism includes a tool body and at least one working head which can be detached therefrom or assembled therewith quickly. The tool body includes a machine body housing, a motor mounted in the machine body housing, and a working head engagement device which is arranged at an output end of the tool body and can detach or assemble the working head quickly. A switch body which controls the tool body to start is fixedly arranged on the tool body. A button is movably arranged on the switch body. A locking device for locking the working head in an axial direction is also arranged in the tool body. A main body of the locking device is arranged in the machine body housing and is arranged out of the working head engagement device. The locking device is connected to the inner wall of the machine body housing through screw threads or a slope.

A safety mechanism for locking the button is arranged between the tool body and the working head.

In a preferred embodiment, the working head is provided with a working head connecting end which is connected and matched with the tool body. The working head connecting end is provided with an extending step which extends in the axial direction. An outer engagement unit is arranged on the extending step. The working head engagement device is provided with an engagement outer ring surface. The engagement outer ring surface is provided with an outer ring step. The outer ring step is provided with a rotating side wing and an axial abutment surface. The inner surface of the working head engagement device is provided with a protruding inner engagement unit. The protruding inner engagement unit is provided with a guide slope and an axial locking surface. The working head engagement device is also provided with axial bosses which extend in the axial direction. When the working head engagement device is connected to the working head, the guide slope is axially pushed by the outer engagement unit to realize circumferential rotation of the working head engagement device. A motor bracket is also fixedly arranged at an output end of the motor. A limiting groove for the axial bosses which are axially inserted into the working head engagement device is arranged on the motor bracket. Resetting elements are arranged in the limiting groove. Rotating resetting of the axial bosses in the positioning groove is realized through the support of the resetting elements.

In another preferred embodiment, the locking device can rotate circumferentially around an output shaft, and has at least three working states of an unlocked state, an engaged state, and a locked state. The locking device may be switched among the three working states. When in the unlocked state and the engaged state, the locking device is linked with the working head engagement device in a manner of rotating circumferentially. When in the locked state, the locking device is axially linked with the working head engagement device. In another preferred embodiment, the locking device is provided with a locking inner ring surface and a locking outer ring surface. The locking outer ring surface is provided with at least one section of screwing convex rib. The locking inner ring surface of the locking device is axially connected with an engagement outer ring surface of the working head engagement device in a sleeving manner. An inner ring step is also arranged on the locking inner ring surface. A conducting surface and a groove are formed in the inner ring step. The conducting surface and the axial abutment surface on the working head engagement device axially displace to butt against each other when the locking device is in the locked state. The groove is axially connected to the rotating side wing in a sleeving manner, and when in the unlocked state and the engaged state, the locking device is rotatably linked with the working head engagement device.

In another preferred embodiment, the locking outer ring surface of the locking device is provided with a deflector rod. The deflector rod can rotate circumferentially around a shaft, and is arranged in a notch in the machine body housing.

In another preferred embodiment, a screwing groove which is matched with the screwing convex rib of the locking device is formed in the inner wall of the machine body housing. The screwing groove is in tight fit with the screwing convex rib when the locking device is in the locked state, and the screwing groove is separated from the screwing convex rib when the locking device in the unlocked state.

In another preferred embodiment, a mounting notch is formed in the machine body housing. A fastening element used for locking the locking device is fixed to the mounting notch. The outer ring surface of the locking device is provided with at least one locking groove which is matched with the above fastening element. The locking groove is in contact with the fastening element when the locking device is in the locked state.

In another preferred embodiment, the safety mechanism includes a locking element which is movably arranged in the tool body and is used for locking the above-mentioned button. A supporting shaft is fixedly arranged on the locking element. The locking element is rotatably arranged in the tool body through the supporting shaft. An engagement part is fixedly arranged at an upper end of the button. One end of the above-mentioned locking element is buckled on the engagement part. The end is a rear end of the locking element. A matching convex part which drives a front end of the locking element to rotate around the supporting shaft to drive the rear end of the locking element to separate from the engagement part is arranged at a lower end of the working head. An unlocking block which can drive the locking element to rotate is arranged on the matching convex part. A returning spring which drives the front end of the locking element to rotate around the supporting shaft to drive the rear end of the locking element to be locked on the engagement part in a resetting manner is arranged in the tool body.

In another preferred embodiment, an engagement surface is formed in one end, matched with the locking element, of the engagement part. A locking surface used for locking on the engagement surface is formed in the rear end of the locking element. A triggering surface which is in contact with the above-mentioned unlocking block is formed in the front end of the locking element. A clamping groove used for clamping the above-mentioned unlocking block is formed in the triggering surface.

In another preferred embodiment, a reversing block which is used for adjusting a current direction in a switch body is rotatably arranged on the switch body. A swinging boss is fixedly arranged at one end, far away from the switch body, of the reversing block. A reversing dial button which is used for driving the reversing block to rotate is movably arranged on the tool body. A translation groove which is formed in the swinging boss in a sleeving manner is formed in the reversing dial button. The above-mentioned swinging boss is clamped in the translation groove. A deflection element which is used for locking the reversing dial button is rotatably arranged on the tool body. A translation boss is fixedly arranged on the reversing dial button. A deflection groove used for clamping on the above-mentioned translation boss is formed in the rear end of the deflection element. The reversing dial button can move in the length direction of the reversing dial button and drive the deflection element and the reversing block to rotate. A deflection triggering surface which is clamped on the above-mentioned matching convex part is formed in the front end of the deflection element. A fixed block which is used for locking the deflection element is fixedly arranged on the matching convex part. A deflection triggering surface on the deflection element can only be located on one side of the fixed block. The unlocking block can move in the length direction of the matching convex part and drive the locking element to rotate. A working head safety spring which drives the unlocking block away from the matching convex part is also arranged on the matching convex part.

Compared with the prior art, in the present disclosure, the working head is mounted on the machine body housing through the working head engagement device. The locking device which is arranged on the periphery of the working head engagement device in a sleeving manner and is rotatably arranged in the machine body housing drives the working head engagement device and the working head to move to the direction of the machine body housing and locks the working head engagement device. The locking device has three states of an unlocked state, an engaged state, and a locked state. When the working head is mounted on the machine body housing, the locking device is in the engaged state. The locking device is rotated from the engaged state from the locked state through the screwing convex rib which is fixedly arranged on the periphery of the locking device and the screwing groove which is fixedly formed in the mounting ring groove and is matched with the screwing convex rib. The locking device rotates circumferentially, and simultaneously, drives the working head engagement device and the working head to move to the direction of the machine body housing in the axial direction of the locking device to complete the locking of the working head, which effectively reduces the clearance between the working head and the machine body housing, greatly reduces the loss of the working head during use, greatly prolongs the service lives of the working head and the machine body housing. The button is locked through the safety mechanism, and the button cannot be pressed down, which effectively avoids accidental startup of the tool.

Figure 1:
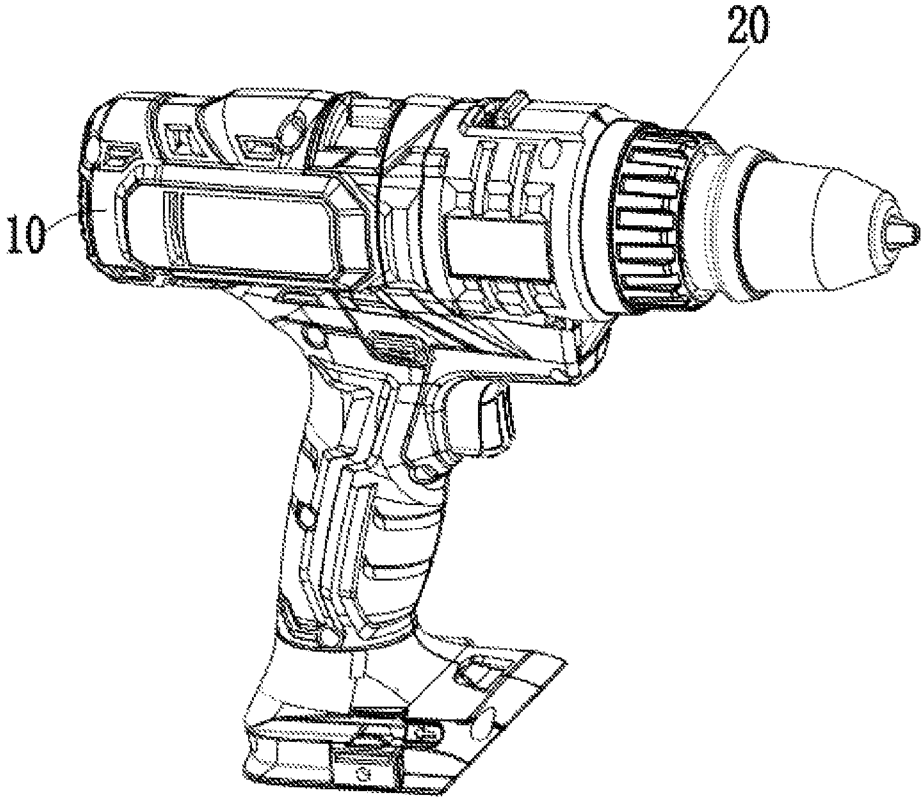
FIG. 1 is a view of an overall structure of the present disclosure.

Reference of elements in the drawings: 10-tool body; 11-machine body housing; 12-motor; 14-motor bracket; 15-resetting element; 16-working head engagement device; 17-locking outer ring surface; 18-working head connecting end; 19-extending step; 20-working head; 21-locking device; 22-screwing convex rib; 23- guide slope; 24-axial boss; 25-rotating side wing; 26-axial abutment surface; 27-outer ring step; 28-axial locking surface; 29-groove; 30-deflector rod; 31-outer engagement element; 32-limiting groove; 33-conducting surface; 34-locking inner ring surface; 35-notch; 36-inner ring step; 37-inner engagement element; 38-engagement outer ring surface; 41-screwing groove; 42-fastening element; 43-mounting notch; 45-locking groove; 46-switch body; 47-button; 48-engagement part; 49-returning spring; 50-triggering slope; 51-locking element; 52-deflection element; 53-matching convex part; 54-deflection groove; 55-swinging boss; 56-translation groove; 57-reversing dial button; 58-translation boss; 59-working head safety spring; 60-deflection triggering surface; 61-locking surface; 62-supporting shaft; 63-engagement surface; 64-unlocking block; 65-clamping groove; 66-reversing block; 67-fixed block; and 68-safety mechanism.

DETAILED DESCRIPTION OF THE EMBODIMENTS

Figure 2:
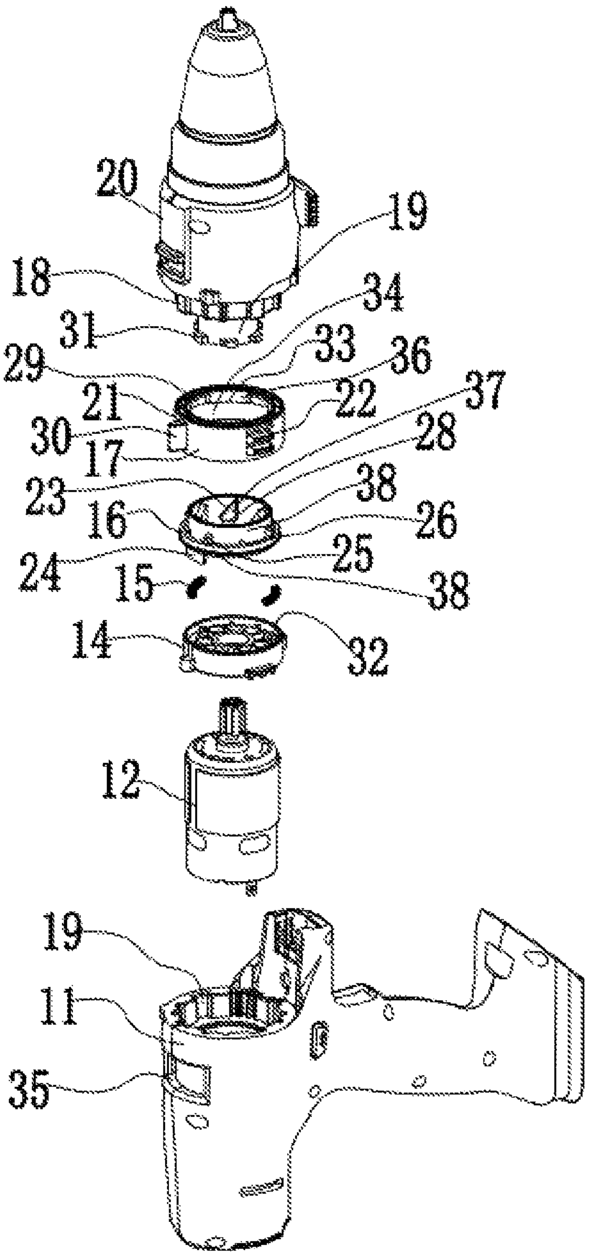
FIG. 2 is an exploded view of the structure of the present disclosure.
Figure 3:
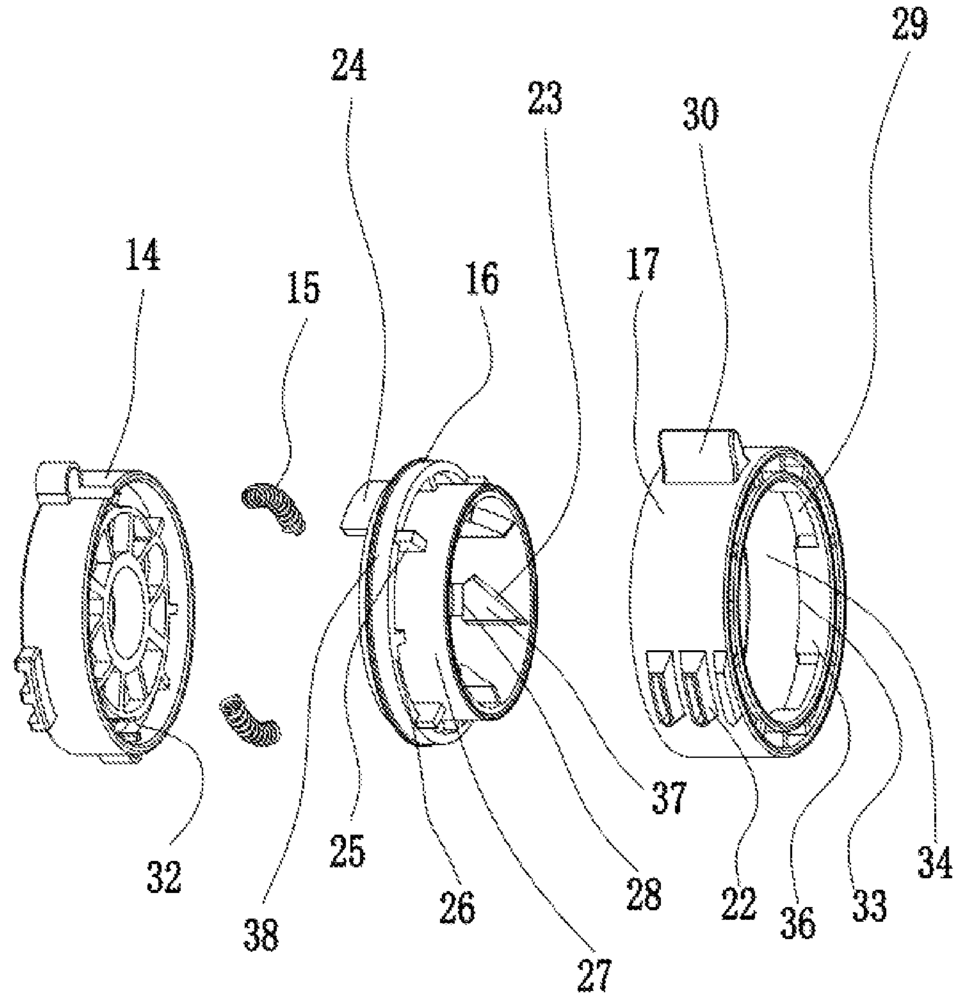
FIG. 3 is a view of an overall structure of a motor bracket, a working head engagement device, and a locking device.
Figure 4:
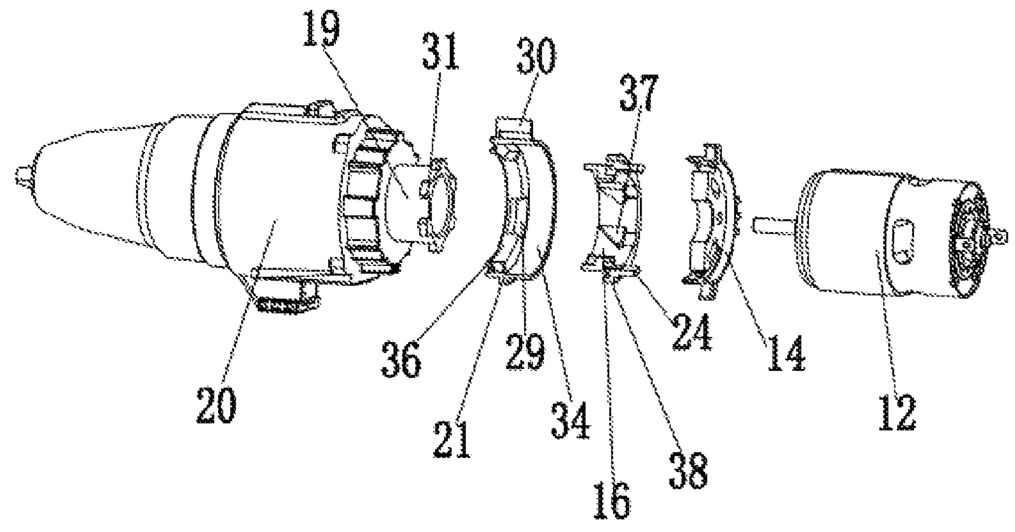
FIG. 4 is a sectional view of the motor bracket, the working head engagement device, and the locking device.
Figure 5:
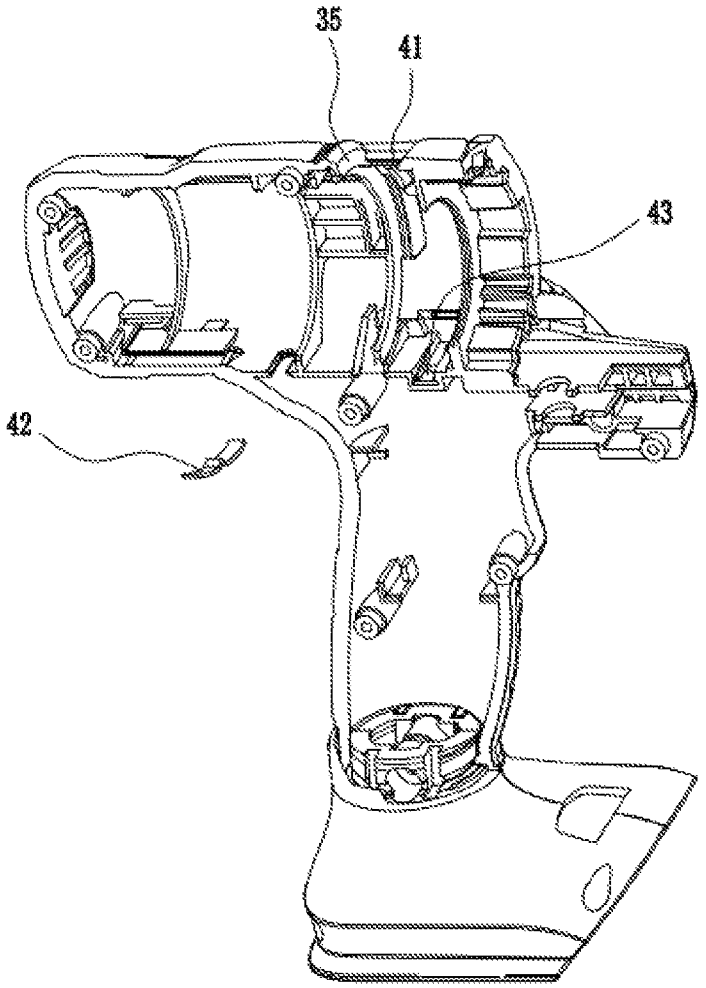
FIG. 5 is a sectional view of a machine body housing.
Figure 6:
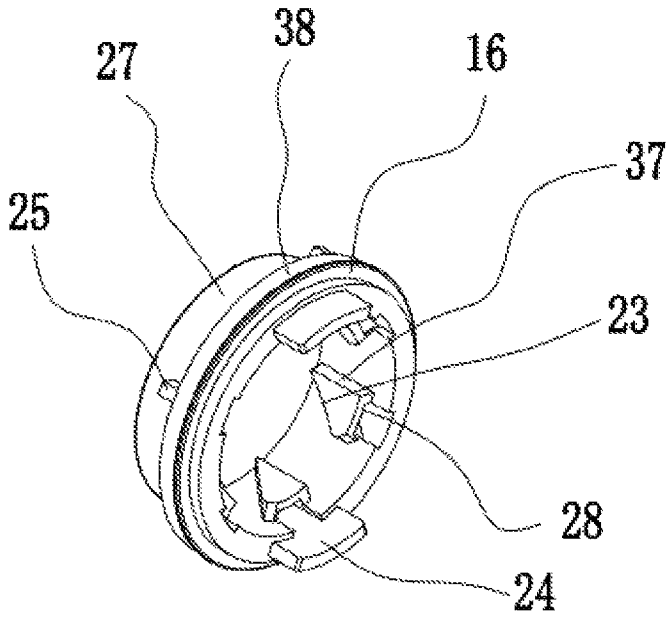
FIG. 6 is a view of an overall structure of the working head engagement device.
Figure 7:
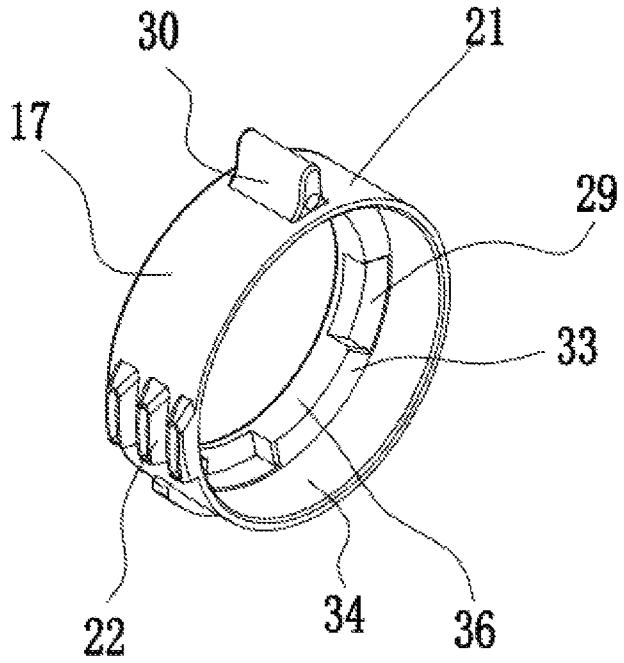
FIG. 7 is a view of an overall structure of the locking device.
Figure 8:
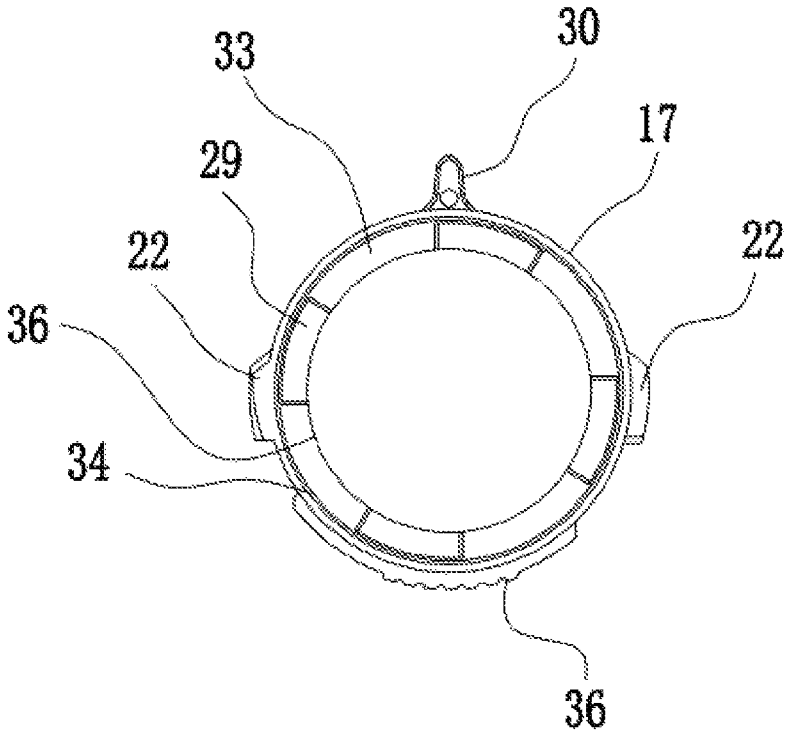
FIG. 8 is a front view of the locking device.
Figure 9:
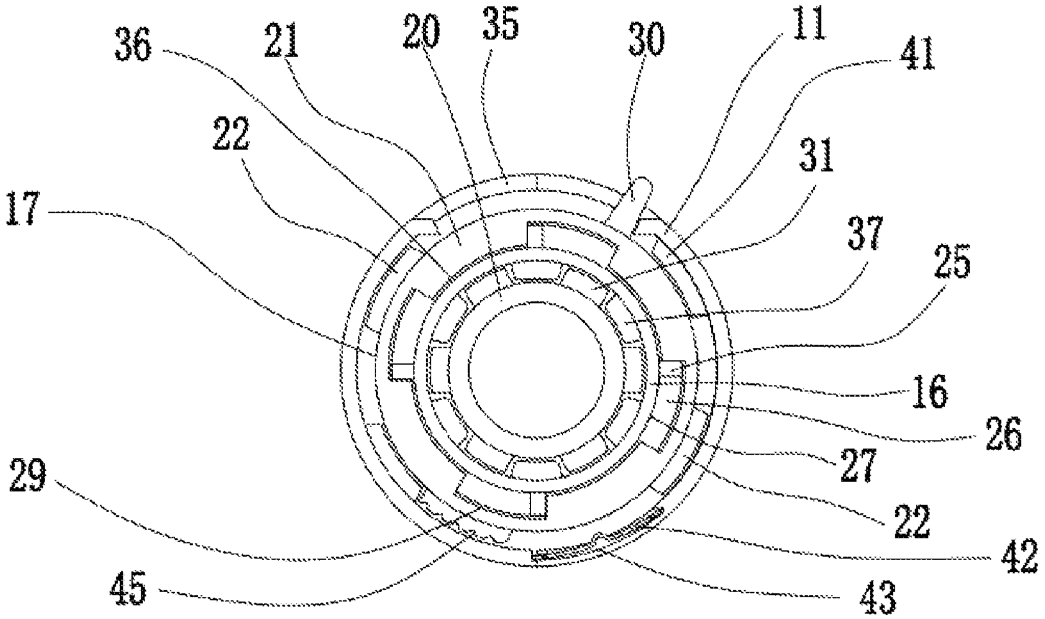
FIG. 9 is a schematic diagram of an unlocking device in an unlocked state.
Figure 10:
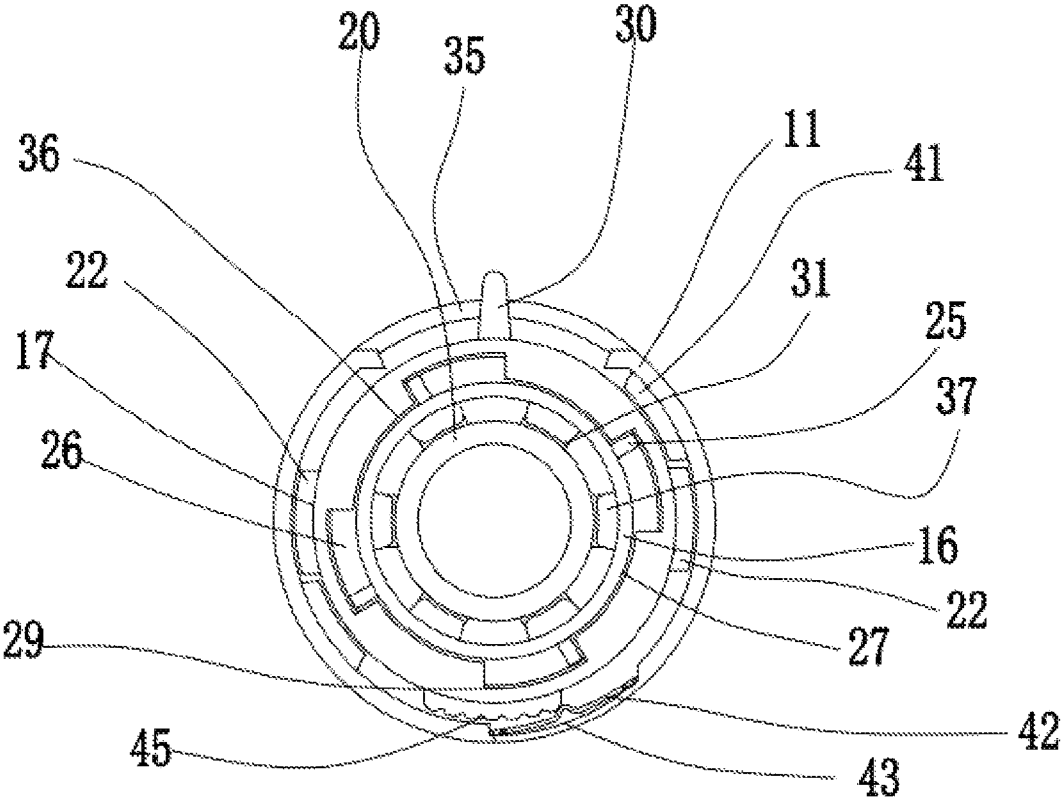
FIG. 10 is a schematic diagram of the unlocking device in an engaged state.
Figure 11:
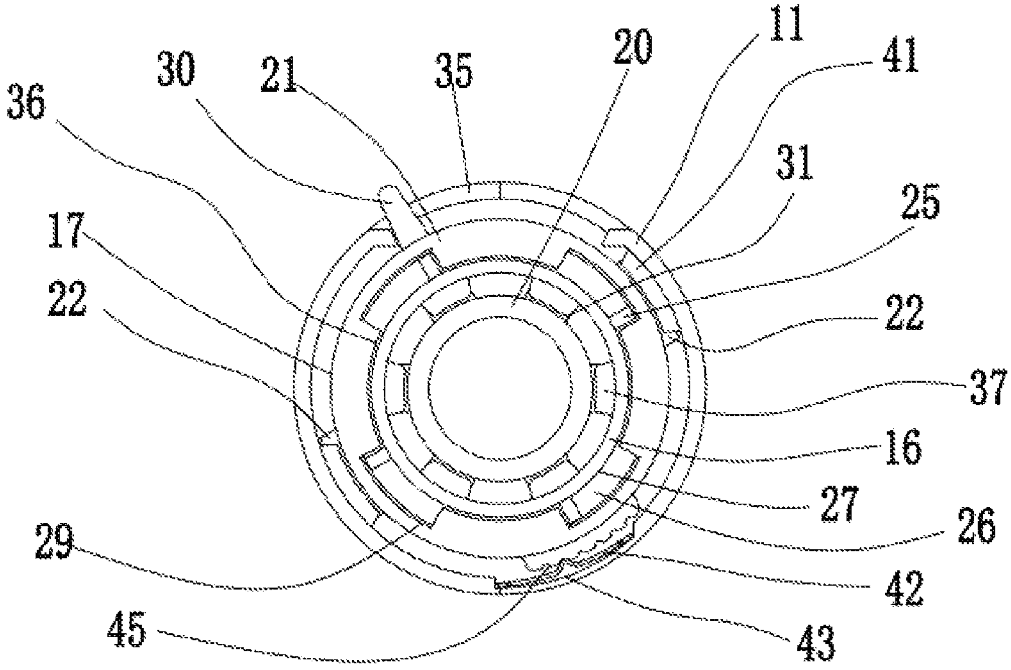
FIG. 11 is a schematic diagram of the unlocking device in a locked state.
Figure 12:
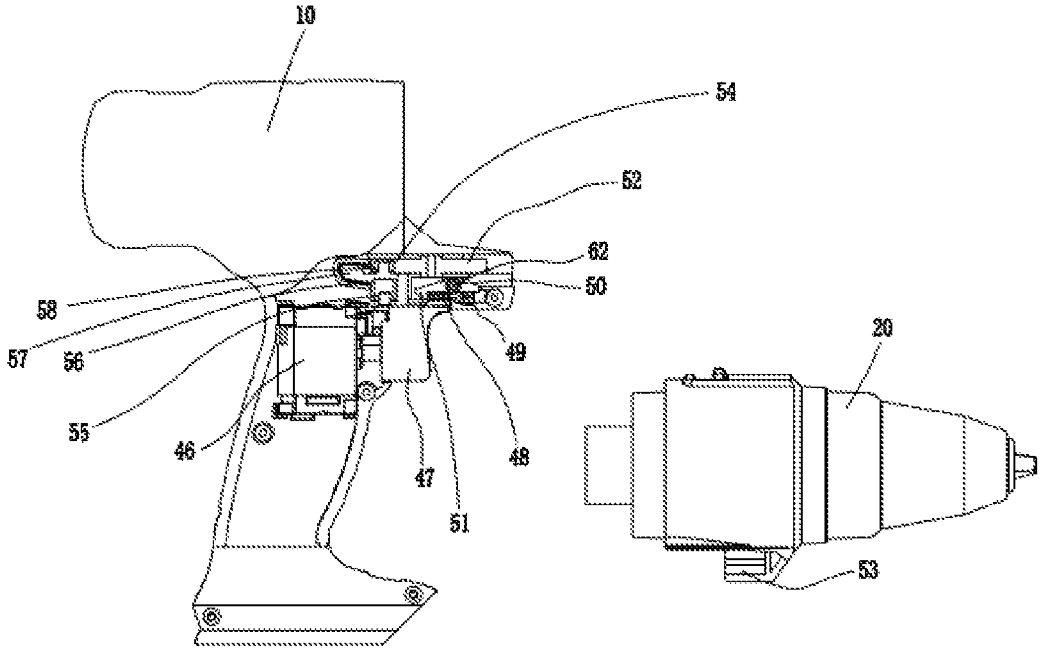
FIG. 12 is an internal view of a safety mechanism.
Figure 13:
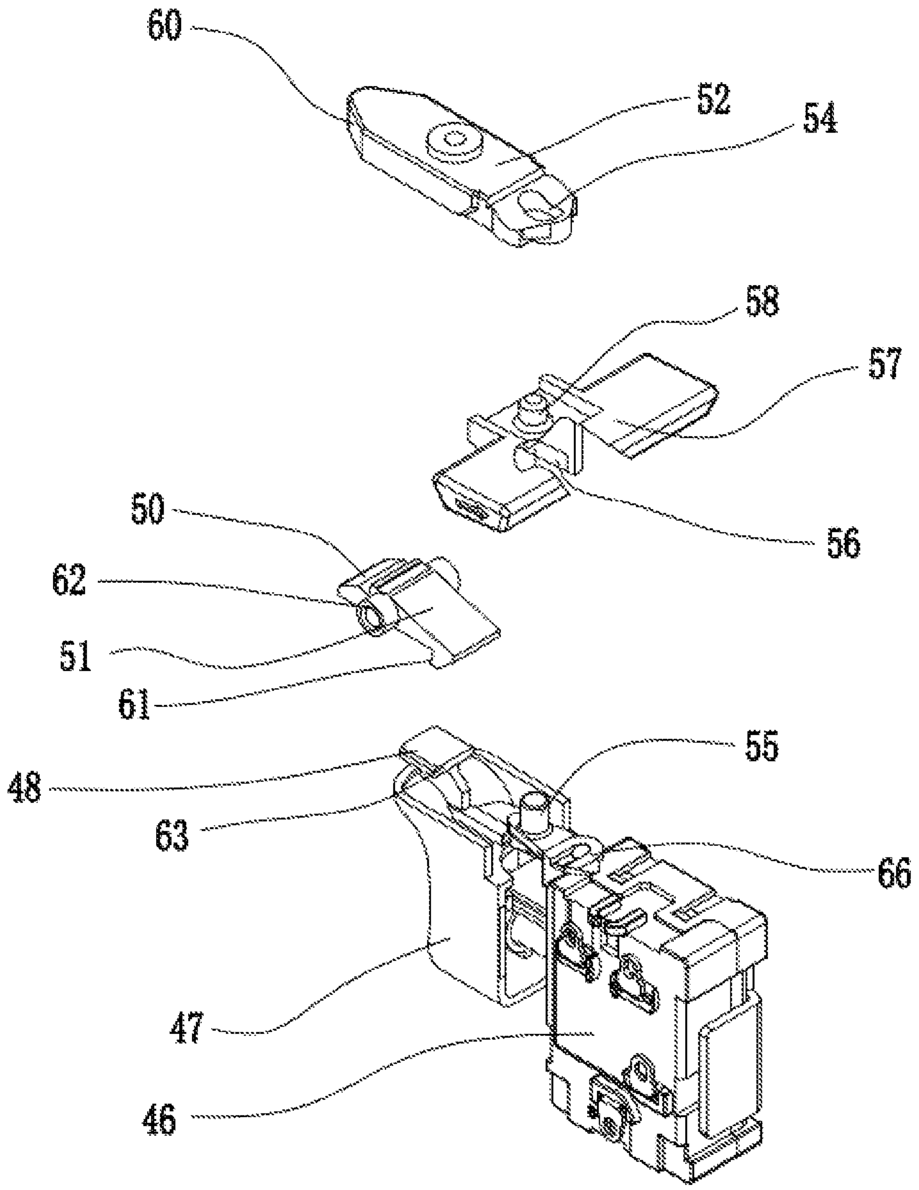
FIG. 13 is an exploded view of a structure at a button and a locking element.
Figure 14:
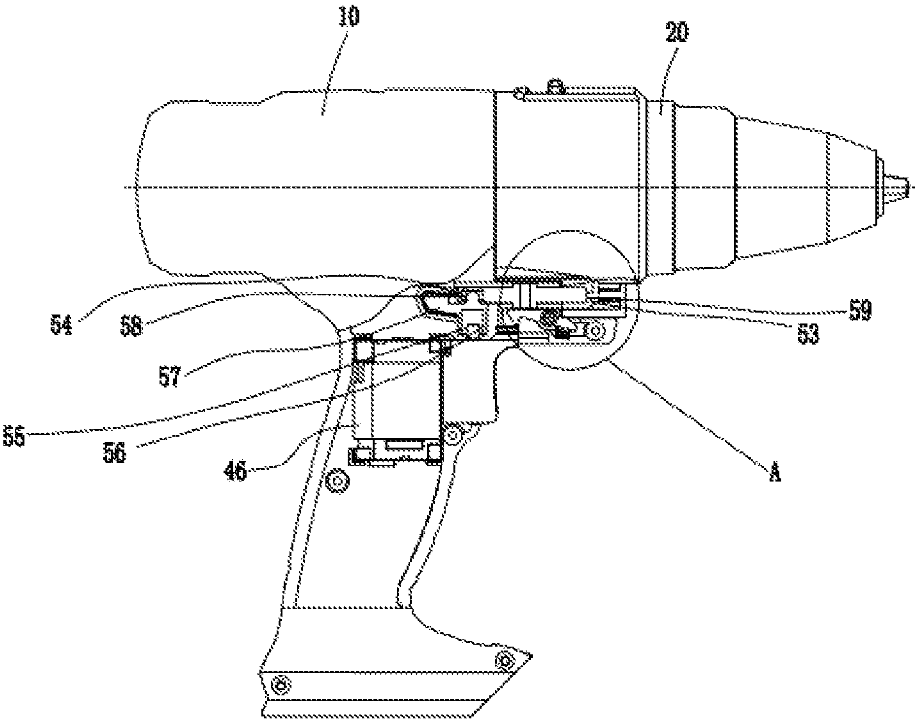
FIG. 14 is a view of an internal structure of an unlocking block after being pressed.
Figure 15:
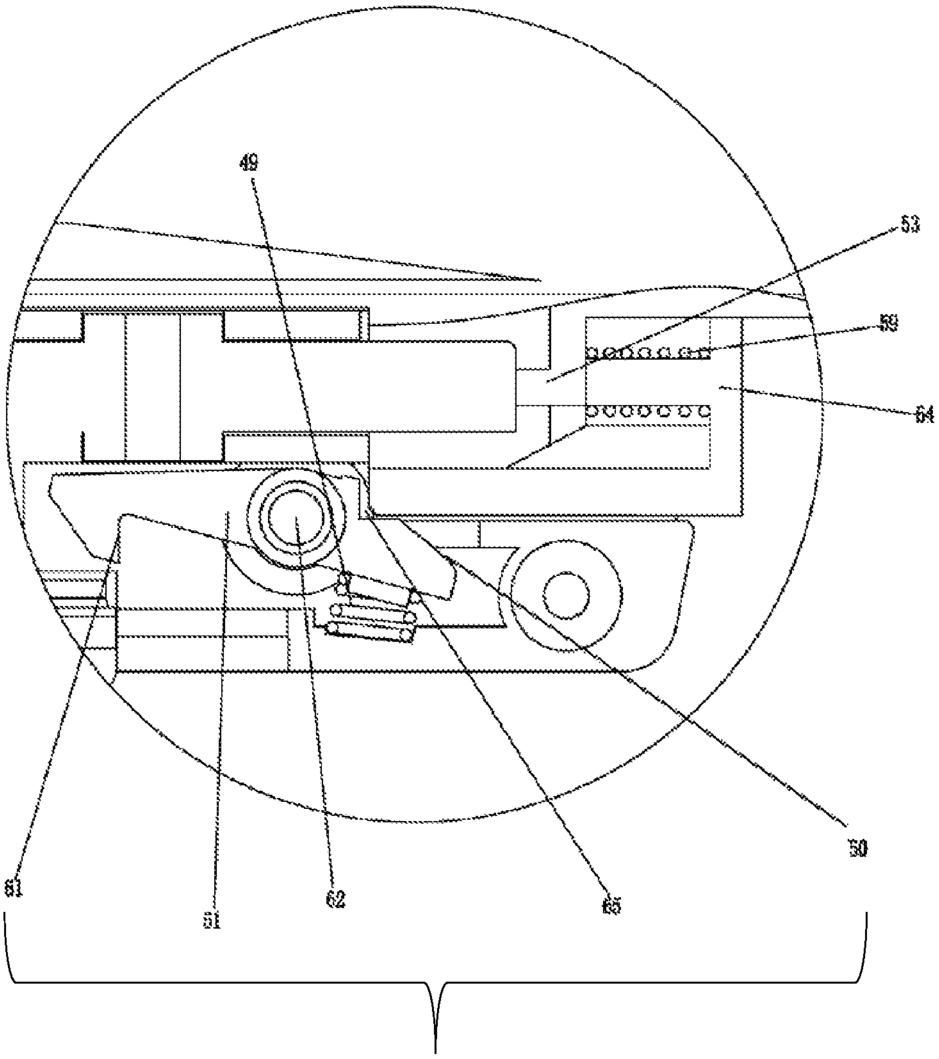
FIG. 15 is an enlarged view of a position A in FIG. 14.
Figure 16:
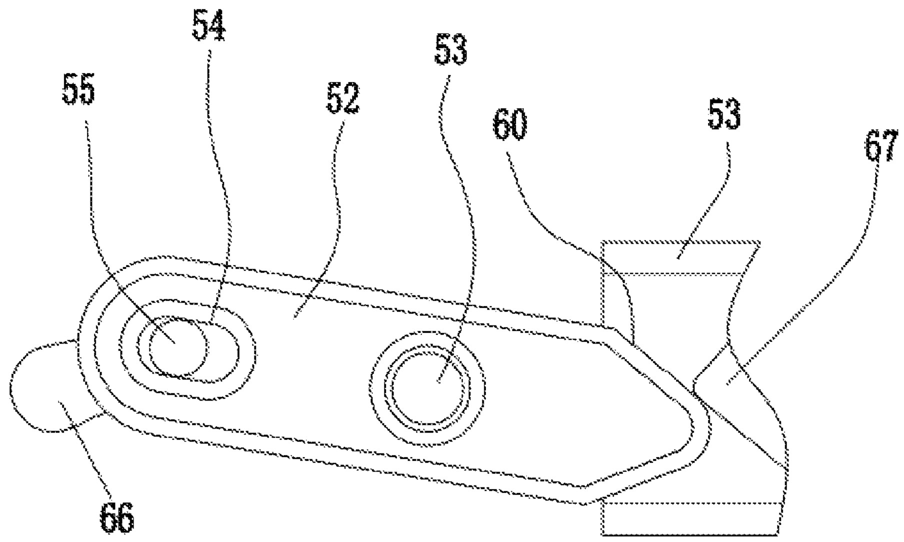
FIG. 16 is a view of an overall structure of a deflection element.

The present invention is further demonstrated below with reference to the embodiments shown in the accompanying drawings. As shown in FIG. 1 to FIG. 16, a head replaceable electric tool with a safety mechanism includes a tool body 10 and at least one working head 20 which can be detached therefrom or assembled therewith quickly. The tool body 10 includes a machine body housing 11, a motor 12 mounted in the machine body housing 11, and a working head engagement device 16 which is arranged at an output end of the tool body 10 and can detach or assemble the working head 20 quickly. A switch body 46 which controls the tool body 10 to start is fixedly arranged on the tool body 10. A button 47 is movably arranged on the switch body 46. A locking device 21 for locking the working head 20 in an axial direction is also arranged in the tool body 10. A main body of the locking device 21 is arranged in the machine body housing 11 and is arranged out of the working head engagement device 16. The locking device 21 is connected to the inner wall of the machine body housing 11 through a slope. After the working head 20 is mounted, the working head 20 is axially displaced and locked through the locking device, so as to reduce a clearance between the working head 20 and the machine body housing 11. A safety mechanism 68 for locking the button 47 is arranged between the tool body 10 and the working head 20.

The working head 20 is provided with a working head connecting end 18 which is connected and matched with the tool body 10. The working head connecting end 18 is provided with an extending step 19 which extends in the axial direction. An outer engagement unit 31 is arranged on the extending step 19. The working head engagement device 16 is provided with an engagement outer ring surface 38. The engagement outer ring surface 38 is provided with an outer ring step 27. The outer ring step 27 is provided with a rotating side wing 25 and an axial abutment surface 26. The inner surface of the working head engagement device 16 is provided with a protruding inner engagement unit 37. The inner engagement unit 37 is provided with a guide slope 23 and an axial locking surface. The working head engagement device 16 is also provided with axial bosses 24 which extend in the axial direction. When the working head engagement device 16 is connected to the working head 20, the guide slope 23 is axially pushed by the outer engagement unit 31 to realize circumferential rotation of the working head engagement device 16. A motor bracket 14 is also fixedly arranged at an output end of the motor 12. A limiting groove 32 for the axial bosses 24 which are axially inserted into the working head engagement device 16 is arranged on the motor bracket 14. Resetting elements 15 are arranged in the limiting groove 32. Rotating resetting of the axial bosses 24 in the positioning groove is realized through the support of the resetting elements 15.

The locking device 21 can rotate circumferentially around an output shaft, and has at least three working states of an unlocked state, an engaged state, and a locked state. The locking device 21 may be switched among the three working states. When in the unlocked state and the engaged state, the locking device 21 is linked with the working head engagement device 16 in a manner of rotating circumferentially. When in the locked state, the locking device 21 is axially linked with the working head engagement device 16. The locking device 21 is provided with a locking inner ring surface 34 and a locking outer ring surface 17. The locking outer ring surface 17 is provided with at least one section of screwing convex rib 22. The locking inner ring surface 34 of the locking device 21 is axially connected with an engagement outer ring surface 38 of the working head engagement device 16 in a sleeving manner. An inner ring step 36 is also arranged on the locking inner ring surface 34. A conducting surface 33 and a groove 29 are formed in the inner ring step 36. The conducting surface 33 and the axial abutment surface 26 on the working head engagement device 16 axially displace to butt against each other when the locking device 21 is in the locked state. The groove 29 is axially connected to the rotating side wing 25 in a sleeving manner, and when in the unlocked state and the engaged state, the locking device 21 is rotatably linked with the working head engagement device 16. The locking outer ring surface 17 of the locking device 21 is provided with a deflector rod 30. The deflector rod 30 can rotate circumferentially around a shaft, and is arranged in a notch 35 in the machine body housing 11. A screwing groove 41 which is matched with the screwing convex rib 22 of the locking device 21 is formed in the inner wall of the machine body housing 11. The screwing groove 41 is in tight fit with the screwing convex rib 22 when the locking device 21 is in the locked state, and the screwing groove 41 is separated from the screwing convex rib 22 when the locking device 21 in the unlocked state.

A mounting notch 43 is formed in the machine body housing 11. A fastening element 42 used for locking the locking device 21 is fixed to the mounting notch 43. The outer ring surface of the locking device 21 is provided with at least one locking groove 45 which is matched with the above-mentioned fastening element 42. The locking groove 45 is in contact with the fastening element 42 when the locking device 21 is in the locked state. The locking device 21 in the engaged state and the locked state is fixed through the fastening element 42, which prevents the locking device 21 from resetting due to vibration, resulting in that the locking device 21 is separated from the locked state.

The working head 20 is mounted on the machine body housing 11 through the working head engagement device 16. The working head engagement device 16 and a working head 20 are driven to move to a direction of the machine body housing 11 by the locking device 21 which is arranged on the periphery of the working head engagement device 16 in a sleeving manner and is rotatably arranged in the machine body housing 11, and the working head engagement device 16 is locked. The locking device 21 has three states of an unlocked state, an engaged state, and a locked state. When the working head 20 is mounted on the machine body housing 11, the locking device 21 is located in the engaged state. The locking device 21 is rotated from the engaged state to the locked state through the screwing convex rib 22 which is fixedly arranged on the periphery of the locking device 21 and the screwing groove 41 which is fixedly formed in a mounting ring groove and is matched with the screwing convex rib 22. The locking device 21 rotates in a circumferential direction and simultaneously drives the working head engagement device 16 and the working head 20 to move to the direction of the machine body housing 11 in the axial direction of the locking device 21, so as to complete the locking of the working head 20, which effectively reduces the clearance between the working head 20 and the machine body housing 11, greatly reduces the loss of the working head 20 during use, and greatly prolongs the service lives of the working head 20 and the machine body housing 11.

The safety mechanism 68 includes a locking element 51 which is movably arranged in the tool body 10 and is used for locking the above-mentioned button 47. A supporting shaft 62 is fixedly arranged on the locking element 51. The locking element 51 is rotatably arranged in the tool body 10 through the supporting shaft 62. An engagement part 48 is fixedly arranged at an upper end of the button 47. One end of the above-mentioned locking element 51 is buckled on the engagement part 48. The end is a rear end of the locking element 51. A matching convex part 53 which drives a front end of the locking element 51 to rotate around the supporting shaft 62 to drive the rear end of the locking element 51 to separate from the engagement part 48 is fixedly arranged at a lower end of the working head 20. An unlocking block 64 which can move in the length direction of the matching convex part 53 and drives the locking element 51 to rotate is movably arranged on the matching convex part 53. A working head safety spring 59 which drives the unlocking block 64 away from the matching convex part 53 is arranged on the matching convex part 53. A returning spring 49 which drives the front end of the locking element 51 to rotate around the supporting shaft 62 to drive the rear end of the locking element 51 to be locked on the engagement part 48 is arranged in the tool body 10.

An engagement surface 63 is formed in one end, far away from the locking element 51, of the engagement part 48. A locking surface 61 used for locking on the engagement surface 63 is formed in the rear end of the locking element 51. The locking element 51 is buckled on the engagement surface 63 on the engagement part 48 through the engagement surface 63.

A triggering slope 50 which is in contact with the above-mentioned unlocking block 64 is formed in the front end of the locking element 51. The unlocking block 64 is in contact with the triggering slope on the locking element 51 first during moving of the locking element 51. The locking element 51 is driven to rotate around the supporting shaft 62 through the triggering slope 50, so that the rear end of the locking element 51 is separated from the engagement part 48 to complete unlocking, and the action that the unlocking block 64 drives the locking element 51 to complete unlocking is more smooth.

A clamping groove 65 used for clamping the above-mentioned unlocking block 64 is formed in the triggering slope 50. After the unlocking block 64 drives the locking element 51 to rotate to complete the unlocking of the engagement part 48, the unlocking block 64 is clamped in the clamping groove 65, which prevents the unlocking block 64 from sliding after completing the unlocking, and is safer and more reliable during use.

The locking element 51 which is rotatably arranged in the tool body 10 is clamped on the engagement part 48 of the button 47. When the working head 20 is not mounted or the working head 20 is mounted, a user accidentally touches the button 47. The locking element 51 is buckled on the engagement surface 63 of the engagement part 48 through the locking surface 61, the locking of the button 47 is realized, and the button 47 cannot be pressed down, which avoids accidental startup of the tool. When the tool body 10 needs to be used, the working head 20 is mounted on the tool body 10. The unlocking block 64 is pressed, so that the unlocking block 64 moves to the direction of the locking element 51 to be in contact with the triggering slope 50 on the locking element 51. The unlocking block 64 drives the front end of the locking element 51 to rotate around the supporting shaft 62, so that the rear end of the locking element 51 is separated from the engagement part 48. At this time, the tool body 10 can be started by pressing the button 47. The safety is high during use, and the safety of a user and the tool body 10 are effectively protected.

A reversing block 66 which is used for adjusting a current direction in a switch body 46 is rotatably arranged on the switch body 46. A swinging boss 55 is fixedly arranged at one end, far away from the switch body 46, of the reversing block 66. A reversing dial button 57 which is used for driving the reversing block 66 to rotate is movably arranged on the tool body 10. A translation groove 56 which is formed in the swinging boss 55 in a sleeving manner is formed in the reversing dial button 57. The above-mentioned swinging boss 55 is clamped in the translation groove 56. A deflection element 52 which is used for locking the reversing dial button 57 is rotatably arranged on the tool body 10. A translation boss 58 is fixedly arranged on the reversing dial button 57. A deflection groove 54 used for clamping on the above-mentioned translation boss 58 is formed in the rear end of the deflection element 52. The reversing dial button 57 can move in the length direction of the reversing dial button 57 and drive the deflection element 52 and the reversing block 66 to rotate. A deflection triggering surface 60 which is clamped on the above-mentioned matching convex part 53 is formed in the front end of the deflection element 52. A fixed block 67 which is used for locking the deflection element 52 is fixedly arranged on the matching convex part 53. A deflection triggering surface 60 on the deflection element 52 can only be located on one side of the fixed block 67. The current direction is adjusted through the reversing dial button 57, and the working head 20 is mounted on the tool body 10 after the adjustment is completed. At this time, the deflection triggering surface 60 on the deflection element 52 is only located on one side of the fixed block 67 in the matching convex part 53. The deflection element 52 and the reversing dial button 57 are locked through the fixed block 67, which avoids the damage of the tool body 10 caused by touching the reversing dial button 57 by mistake by the tool body 10 during use, and is safe and reliable during use.

Specific embodiments described herein are merely illustrative of the spirit of the present disclosure. Those skilled in the technical art of the present disclosure can make various modifications or supplements to the described specific embodiments or replace the described specific embodiments in similar manners, but will not deviate from the spirit of the present disclosure or beyond the scope defined in the appended claims.

The invention claimed is:

1. A head replaceable electric tool with a safety mechanism, comprising a tool body (10) and at least one working head (20), wherein the working head is detachable, wherein the tool body (10) further comprising a machine body housing (11), a motor (12) mounted in the machine body housing (11), and a working head engagement device (16) arranged at an output end of the tool body (10); wherein a switch body (46) is fixedly arranged on the tool body (10); wherein a button (47) is movably arranged on the switch body (46); wherein a locking device (21) for locking the working head in an axial direction is arranged in the tool body (10); wherein a main body of the locking device (21) is arranged in the machine body housing (11) and is arranged concentrically with the working head engagement device (16); wherein the locking device (21) is connected to an inner wall of the machine body housing (11) through screw threads or a slope; and wherein a safety mechanism (68) for locking the button (47) is arranged between the tool body (10) and the working head (20), wherein the working head is provided with a working head connecting end (18) which is connected and matched with the tool body (10); wherein the working head connecting end (18) is provided with an extending step (19) which extends in the axial direction; wherein an outer engagement unit (31) is arranged on the extending step (19); wherein the working head engagement device (16) is provided with an engagement outer ring surface (38); wherein the engagement outer ring surface (38) is provided with an outer ring step (27); wherein the outer ring step (27) is provided with a rotating side wing (25) and an axial abutment surface (26); wherein the inner surface of the working head engagement device (16) is provided with an inner engagement unit (37); wherein the working head engagement device (16) is provided with axial bosses (24) which extend in the axial direction; wherein a motor bracket (13) is fixedly arranged at an output end of the motor (12); wherein limiting grooves (32) are formed on a surface of the motor bracket (13) away from the motor (12) in a circumferential direction; wherein each of the axial bosses (24) is correspondingly installed in each of the limiting grooves (32);

wherein each of the limiting grooves (32) is equipped with a resetting element (15), one end of the resetting element (15) is attached to an inner wall of the limiting groove (32), and the other end is attached to a side wall of the axial boss (24);

wherein the inner engagement unit (37) is provided with a guide slope (23) and an axial locking surface (28), and the axial locking surface (28) is arranged on one side of the inner engagement unit (37) close to the motor bracket (13);

wherein when the working head engagement device (16) is connected to the working head (20), the outer engagement unit (31) are axially pushed along the guide slope (23) to cause positive circumferential rotation of the working head engagement device (16), and to cause positive circumferential rotation of the axial bosses (24) in the limiting grooves (32) thereby compressing the resetting elements (15);

wherein after the outer engagement unit (31) is pushed axially away from the guide slope (23), the resetting element (15) drives the axial boss (24) to reverse circumferential rotation in the limiting groove (32), thereby automatically compressing the outer engagement unit (31) axially against the axial locking surface (28);

wherein the locking device (21) is capable of rotating circumferentially around an output shaft, and has at least three working states of an unlocked state, an engaged state, and a locked state; wherein the locking device (21) may be switched among the three working states; wherein when in the unlocked state and the engaged state, the locking device (21) is linked with the working head engagement device (16) in a manner of rotating circumferentially; and wherein when in the locked state, the locking device (21) is axially linked with the working head engagement device (16).

2. The head replaceable electric tool with the safety mechanism according to claim 1, wherein locking device (21) is provided with a locking inner ring surface (34) and a locking outer ring surface (17); wherein the locking outer ring surface (17) is provided with at least one section of screwing convex rib (22); wherein the locking inner ring surface (34) of the locking device (21) is axially connected with an engagement outer ring surface (38) of the working head engagement device (16) in a sleeving manner; wherein an inner ring step (36) is also arranged on the locking inner ring surface (34); a conducting surface (33) and a groove (29) are formed in the inner ring step (36); wherein the conducting surface (33) and the axial abutment surface (26) on the working head engagement device (16) axially displace to butt against each other when the locking device (21) is in the locked state; wherein the groove (29) is axially connected to the rotating side wing (25) in a sleeving manner, and wherein the locking device (21) is rotatably linked with the working head engagement device (16) in the unlocked state and the engaged state.

3. The head replaceable electric tool with the safety mechanism according to claim 1, wherein the locking outer ring surface (17) of the locking device (21) is provided with a deflector rod (30); and wherein the deflector rod (30) is capable of rotating circumferentially around a shaft, and is arranged in a notch (35) in the machine body housing (11).

4. The head replaceable electric tool with the safety mechanism according to claim 2, wherein a screwing groove (41) is formed in the inner wall of the machine body housing (11); wherein the screwing groove (41) is separated from the screwing convex rib (22) when the locking device (21) in the unlocked state.

5. The head replaceable electric tool with the safety mechanism according to claim 1, wherein a mounting notch (43) is formed in the machine body housing (11); wherein a fastening element (42) used for locking the above-mentioned locking device (21) is fixed to the mounting notch (43); wherein the outer ring surface of the locking device (21) is provided with at least one locking groove (45) which is matched with the above-mentioned fastening element (42); and wherein the locking groove (45) is in contact with the fastening element (42) when the locking device (21) is in the locked state.

6. The head replaceable electric tool with the safety mechanism according to claim 1, wherein the safety mechanism (68) further comprising a locking element (51) which is movably arranged in the tool body (10) and is used for locking the above-mentioned button (47); wherein a supporting shaft is fixedly arranged on the locking element (51); wherein the locking element (51) is rotatably arranged in the tool body through the supporting shaft; wherein an engagement part (48) is fixedly arranged at an upper end of the button (47); wherein a rear end of the locking element (51) is connected to the engagement part (48); wherein a matching convex part (53) is arranged at a lower end of the working head; wherein an unlocking block (64) which drives the locking element (51) to rotate is arranged on the matching convex part (53); and wherein a returning spring (49) is arranged in the tool body.

7. The head replaceable electric tool with the safety mechanism according to claim 6, wherein an engagement surface (63) is formed in one end, matched with the locking element (51), of the engagement part (48); wherein a locking surface (61) used for locking on the engagement surface (63) is formed in the rear end of the locking element (51); wherein a triggering surface which is in contact with the above-mentioned unlocking block (64) is formed in the front end of the locking element (51); and wherein a clamping groove (65) used for clamping the above-mentioned unlocking block (64) is formed in the triggering surface.

8. The head replaceable electric tool with the safety mechanism according to claim 6, wherein a reversing block (66) which is used for adjusting a current direction in a switch body (46) is rotatably arranged on the switch body (46); wherein a swinging boss (55) is fixedly arranged at one end, not in direct contact with the switch body (46), of the reversing block (66); wherein a reversing dial button (57) which is used for driving the reversing block (66) to rotate is movably arranged on the tool body; wherein a translation groove (56) which is formed in the swinging boss (55) in a sleeving manner is formed in the reversing dial button (57); wherein the swinging boss (55) is clamped in the translation groove (56); wherein a deflection element (52) which is used for locking the reversing dial button (57) is rotatably arranged on the tool body; wherein a translation boss (58) is fixedly arranged on the reversing dial button (57); wherein a deflection groove (54) used for clamping on the above-mentioned translation boss (58) is formed in the rear end of the deflection element (52); wherein the reversing dial button (57) is capable of moving in the length direction of the reversing dial button (57) and drive the deflection element (52) and the reversing block (66) to rotate, wherein a deflection triggering surface (60) which is clamped on the above-mentioned matching convex part (53) is formed in the front end of the deflection element (52); wherein a fixed block (67) which is used for locking the deflection element (52) is fixedly arranged on the matching convex part (53); wherein the deflection triggering surface (60) on the deflection element (52) can only be located on one side of the fixed block (67); wherein the unlocking block (64) is capable of moving in the length direction of the matching convex part (53) and drive the locking element (51) to rotate; and wherein a working head safety spring (59) which drives the unlocking block (64) away from the matching convex part (53) is also arranged on the matching convex part (53).

* * * * *